US009956825B2

(12) United States Patent
Kuwano (10) Patent No.: US 9,956,825 B2
(45) Date of Patent: May 1, 2018

(54) PNEUMATIC TIRE

(71) Applicant: TOYO TIRE & RUBBER CO., LTD., Osaka-shi, Osaka (JP)

(72) Inventor: Shingo Kuwano, Osaka (JP)

(73) Assignee: TOYO TIRE & RUBBER CO., LTD., Itami-shi (JP)

(*) Notice: Subject to any disclaimer, the term of this patent is extended or adjusted under 35 U.S.C. 154(b) by 282 days.

(21) Appl. No.: 14/734,215

(22) Filed: Jun. 9, 2015

(65) Prior Publication Data

US 2015/0360519 A1 Dec. 17, 2015

(30) Foreign Application Priority Data

Jun. 13, 2014 (JP) ................................. 2014-122509

(51) Int. Cl.
*B60C 11/13* (2006.01)
*B60C 11/04* (2006.01)
(Continued)

(52) U.S. Cl.
CPC ........ *B60C 11/1353* (2013.01); *B60C 11/047* (2013.01); *B60C 11/11* (2013.01);
(Continued)

(58) Field of Classification Search
CPC .. B60C 11/1353; B60C 11/1361; B60C 11/13
See application file for complete search history.

(56) References Cited

U.S. PATENT DOCUMENTS 5,549,146 A * 8/1996 Trabandt ............... B60C 11/042
152/154.2
5,975,172 A 11/1999 Nakatsuji
(Continued)

FOREIGN PATENT DOCUMENTS

JP 7-276920 A 10/1995
JP 10-100616 A 4/1998
(Continued)

OTHER PUBLICATIONS

Office Action dated Sep. 29, 2017, issued in counterpart Japanese Application No. 2014-122509, with English machine translation. (4 pages).

*Primary Examiner* — Joseph S Del Sole
*Assistant Examiner* — Cedrick S Williams
(74) *Attorney, Agent, or Firm* — Westerman, Hattori, Daniels & Adrian, LLP (57) ABSTRACT

The present invention provides a pneumatic tire including: a groove formed in a tread, the groove having a groove bottom and groove side surfaces arising from the groove bottom; and a projection projecting from the groove bottom, wherein the projection includes a low-step portion located at a low position with reference to the groove bottom and a high-step portion located at a high position with reference to the groove bottom, the low-step portion has a first-side inclined surface inclined in a depth direction of the groove along a first groove side surface of the groove and a second-side inclined surface inclined in the depth direction of the groove along a second groove side surface of the groove, and the first-side inclined surface and the second-side inclined surface are inclined in different directions from each other.

4 Claims, 9 Drawing Sheets

(51) Int. Cl.
 *B60C 11/03* (2006.01)
 *B60C 11/11* (2006.01)
(52) U.S. Cl.
 CPC ............ *B60C 2011/0346* (2013.01); *B60C 2011/1361* (2013.01)

(56) References Cited

U.S. PATENT DOCUMENTS

| 7,703,491 B2 * | 4/2010 | Oyama | ............... B60C 11/0309 |
| | | | 152/209.19 |
| 2008/0149242 A1 | 6/2008 | Oyama | |

FOREIGN PATENT DOCUMENTS

| JP | 2006-111216 A | 4/2006 |
| JP | 2013-95189 A | 5/2013 |

* cited by examiner

PNEUMATIC TIRE

CROSS-REFERENCE TO RELATED APPLICATION

This application claims the benefit of Japanese Patent Application No. 2014-122509, filed on Jun. 13, 2014, which is incorporated herein by reference.

BACKGROUND OF THE INVENTION

Field of the Invention

The present invention relates to a pneumatic tire in which a projection for suppressing stone sticking is formed.

Background Art

There is a pneumatic tire (hereinafter, referred to as "tire") including a projection (called "stone ejector") for suppressing stone sticking, that is, sticking of small stones in a groove formed in the tread. For example, a tire disclosed in JP H10-100616 A can be mentioned.

The projection of the tire disclosed in JP H10-100616 A is a projection having a triangular prism shape projecting from a groove bottom. Small stones that have entered the groove in which the projection is formed during running of the tire are prevented from entering the inside of the groove by abutting the top surface of the projection. Further, this projection has a triangular cross sectional shape, and therefore the rigidity on the top side in the triangle is lower than the rigidity on the bottom side of the triangle. Accordingly, in the case where small stones enter the groove and press the upper part of the projection, the deformation amount on the top side of this projection is relatively large. In this way, the deformation amount of the projection is different depending on the parts. Therefore, the tread contacts the ground, and the projection swings every time the upper part of the projection is pressed by small stones, which allows the small stones to be ejected from the groove by moving them toward the direction in which the projection easily deforms in the groove.

However, once small stones are stuck between a side of the groove and a side of the projection, the projection having a triangular prism shape is difficult to swing, since the thus stuck small stones do not press the upper part of the projection. Therefore, the stuck small stones are difficult to move in the groove, and may remain stuck without being ejected from the groove in some cases. The small stones remaining stuck in the groove as above are not preferable because the small stones cause damage to the tread such as cracks in blocks by pressing the blocks.

SUMMARY OF THE INVENTION

The present invention therefore provides a pneumatic tire in which small stones are less likely to be stuck in a groove and the small stones even if they are stuck in the groove can be rapidly ejected.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention is, for example, a pneumatic tire including: a groove formed in a tread, the groove having a groove bottom and groove side surfaces arising from the groove bottom; and a projection projecting from the groove bottom, wherein the projection includes a low-step portion located at a low position with reference to the groove bottom and a high-step portion located at a high position with reference to the groove bottom, the low-step portion includes a first-side inclined surface inclined along a first groove side surface of the groove in a depth direction of the groove and a second-side inclined surface inclined along a second groove side surface of the groove in the depth direction of the groove, and the first-side inclined surface and the second-side inclined surface are inclined in different directions from each other.

Further, the configuration may be, for example, such that the first groove side surface and the second groove side surface of the groove are opposed to each other, the first-side inclined surface is located on the first groove side surface side of the high-step portion, the second-side inclined surface is located on the second groove side surface side of the high-step portion, the first-side inclined surface and the second-side inclined surface are inclined in reverse directions to each other, and an inclined connecting surface is located between a low end located at the lowest position on the first-side inclined surface with reference to the groove bottom and a high end located at the highest position on the second-side inclined surface with reference to the groove bottom, with the low end side of the first-side inclined surface located at a high position and the high end side of the second-side inclined surface located at a low position.

Further, the configuration may be, for example, such that the projection has a top surface at the highest position with reference to the groove bottom, and the top surface has an area ratio of the projection of 10 to 20% with respect to a bottom area of the projection.

Further, the configuration may be, for example, such that the projection has a height from the groove bottom of not more than 50% with respect to the depth of the groove.

BRIEF DESCRIPTION OF THE DRAWINGS

The foregoing and other features of the present invention will become apparent from the following description and drawings of an illustrative embodiment of the invention in which.

DETAILED DESCRIPTION OF THE PREFERRED EMBODIMENT

Next, a pneumatic tire according to an embodiment as an example of the present invention is described. In the following description about the "vertical" directions, the "lower" direction is the side closer to the groove bottom (radially inward direction of the tire), and the "upper" direction is the side farther from the groove bottom (radially outward direction of the tire). In particular, in order to indicate a vertical direction in the figure, the expression "the upper side in the figure" or "the lower side in the figure" is used.

Figure 1:
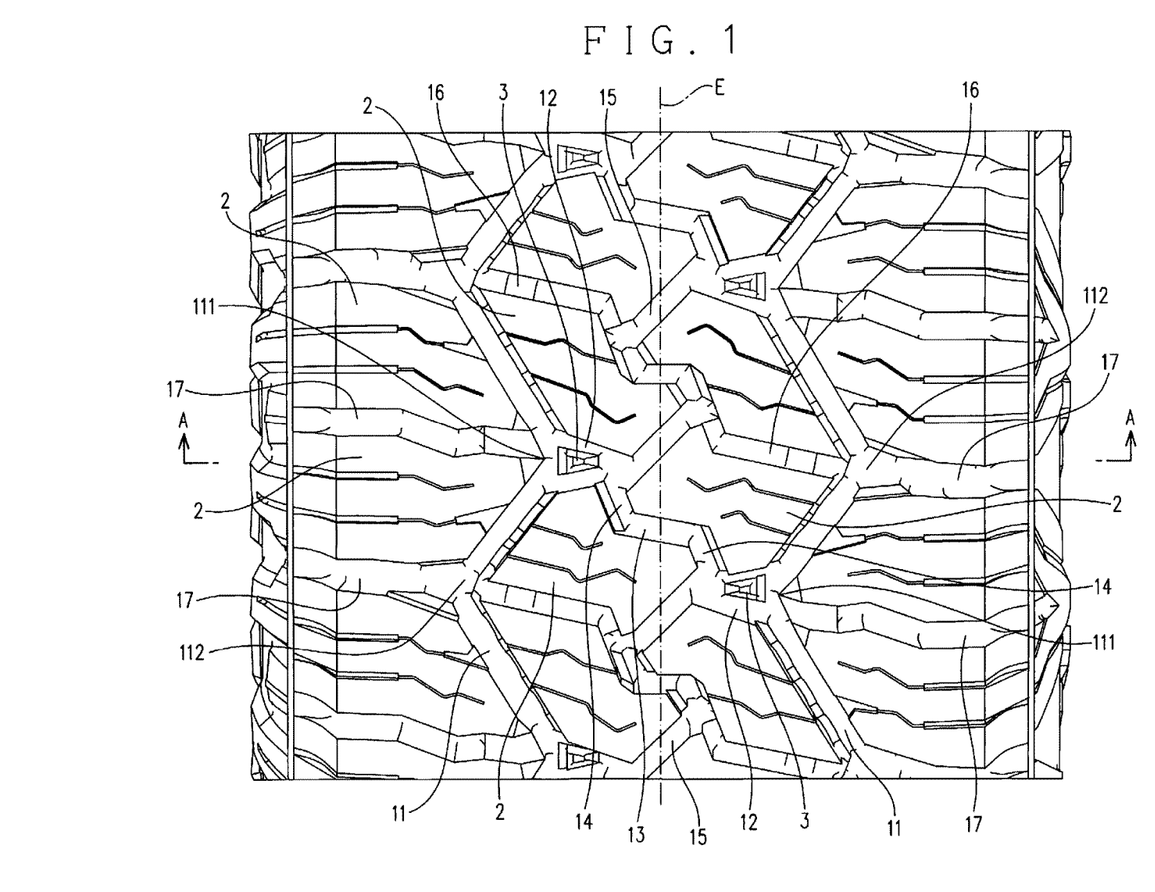
FIG. 1 is a view showing a tread pattern of a pneumatic tire according to an embodiment as an example of the present invention, as viewed in a radially outward direction of the tire.

The tread pattern of the tire of this embodiment is a block pattern as shown in FIG. 1. On the tread of the tire, main grooves 11, transverse grooves 12, transverse groove-intermediating secondary transverse grooves 13, auxiliary grooves 14, circumferential secondary grooves 15, intermediate secondary transverse grooves 16, and shoulder transverse grooves 17 are formed. Each groove has a groove bottom and groove side surfaces arising from the groove bottom.

A main groove 11 is a groove formed so as to have "V"-shapes that are continuous in the tire circumferential direction. That is, the main groove 11 is a groove extending inclined at a specific angle in the tire circumferential direction, bending at bent portions 111 and 112 at substantially the same angle as the specific angle in the reverse direction of the tire width direction, and extending in the reverse direction, repeatedly.

On the tread of this embodiment, two main grooves 11 are formed parallel to each other respectively on a first side and a second side in the tire width direction. The main groove 11 on the first side and the main groove 11 on the second side with the tire equator E interposed therebetween are in a relationship displaced in parallel from each other in the tire width direction. That is, the bent portion 112 of the second main groove 11 that is farther from the tire equator E is located at a position displaced from the bent portion 111 of the first main groove 11 that is closer to the tire equator E in the tire width direction over the tire equator E. Likewise, the bent portion 111 of the second main groove 11 that is closer to the tire equator E is located at a position displaced from the bent portion 112 of the first main groove 11 that is farther from the tire equator E in the tire width direction over the tire equator E.

Figure 3A:
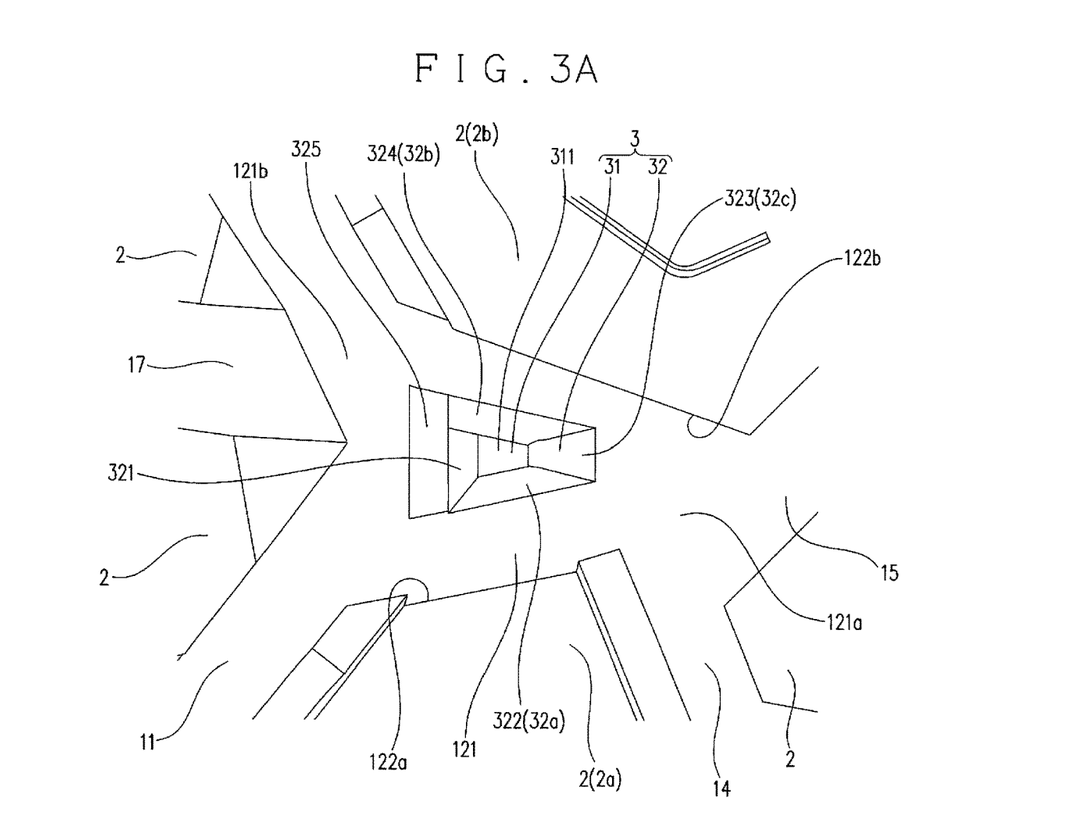
FIG. 3A is an enlarged view of a main part around a stone-sticking prevention projection, as viewed in a radially outward direction of the tire.

A transverse groove 12 is a groove that is connected to the bent portion 111 of the main groove 11 closer to the tire equator E and extends toward the tire equator E substantially along the tire width direction. As shown in FIG. 3A, the transverse groove 12 has a groove bottom 121 and groove side surfaces 122a and 122b arising from the groove bottom 121. As will be described later, a stone-sticking prevention projection 3 projects from the groove bottom 121. The first groove side surface 122a and the second groove side surface 122b of the transverse groove 12 are opposed to each other. Specifically, the transverse groove 12 is a wedge-shaped groove having a smaller width (distance between the groove side surfaces) in a portion closer to the tire equator E and a larger width in a portion farther from the tire equator E in plan view (which is hereinafter a view as viewed from the outer side of the tire diameter in this description). The edge portions in the tire circumferential direction of the transverse groove 12 are linear and are substantially parallel to the stone-sticking prevention projection 3, which will be described below, as shown in the figure.

A transverse groove-intermediating secondary transverse groove 13 is a groove extending over the tire equator E while being inclined with respect to the tire width direction. The transverse groove-intermediating secondary transverse groove 13 has both ends connected to ends on the tire equator E side of the transverse grooves 12 via the auxiliary grooves 14. A circumferential secondary groove 15 is a groove extending over the tire equator E, while being curved to form a substantially "S"-shape, continuously in the tire circumferential direction. The circumferential secondary groove 15 has both ends connected to ends on the tire equator E side of the transverse grooves 12. An intermediate secondary transverse groove 16 is a groove extending inclined with respect to the tire width direction from the bent portion 112 of the main groove 11 that is farther from the tire equator E toward the tire equator E. The end on the tire equator E side of the intermediate secondary transverse groove 16 is connected to the circumferential secondary groove 15. The shoulder transverse grooves 17 are grooves extending substantially in the tire width direction respectively from the bent portion 111 of the main groove 11 closer to the tire equator E and the bent portion 112 of the main groove 11 that is farther from the tire equator E toward the ends in the width direction of the tire.

The tread is partitioned by the aforementioned grooves, thereby forming a plurality of blocks (lands) 2. Further, narrow grooves or sipes are formed in each block other than the aforementioned grooves. Thus, the rigidity of the block 2 is adjusted according to the application of the tire. However, these narrow grooves and sipes desirably have a groove depth of 80% or less of the main grooves 11, in order to prevent cuts and chips (damage such that the block is chopped) due to a reduction in rigidity of the block 2.

Figure 2:
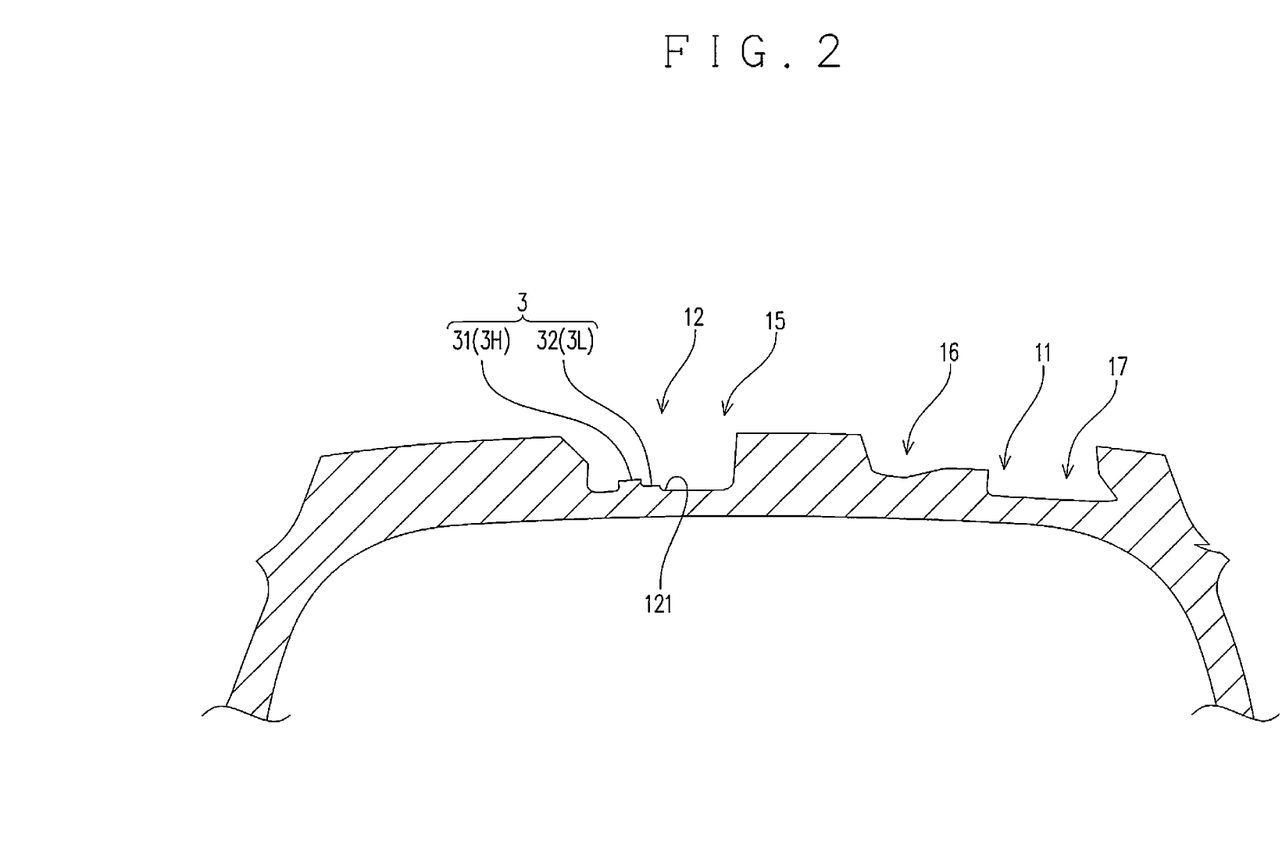
FIG. 2 is an end view taken along the line A-A in FIG. 1.
Figure 3B:
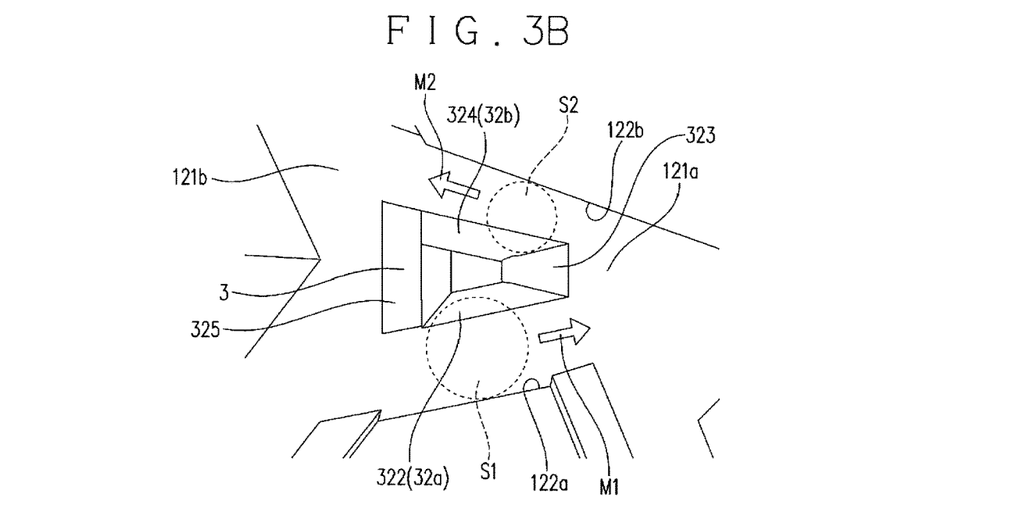
FIG. 3B is an explanatory diagram showing the movement of small stones.
Figure 4:
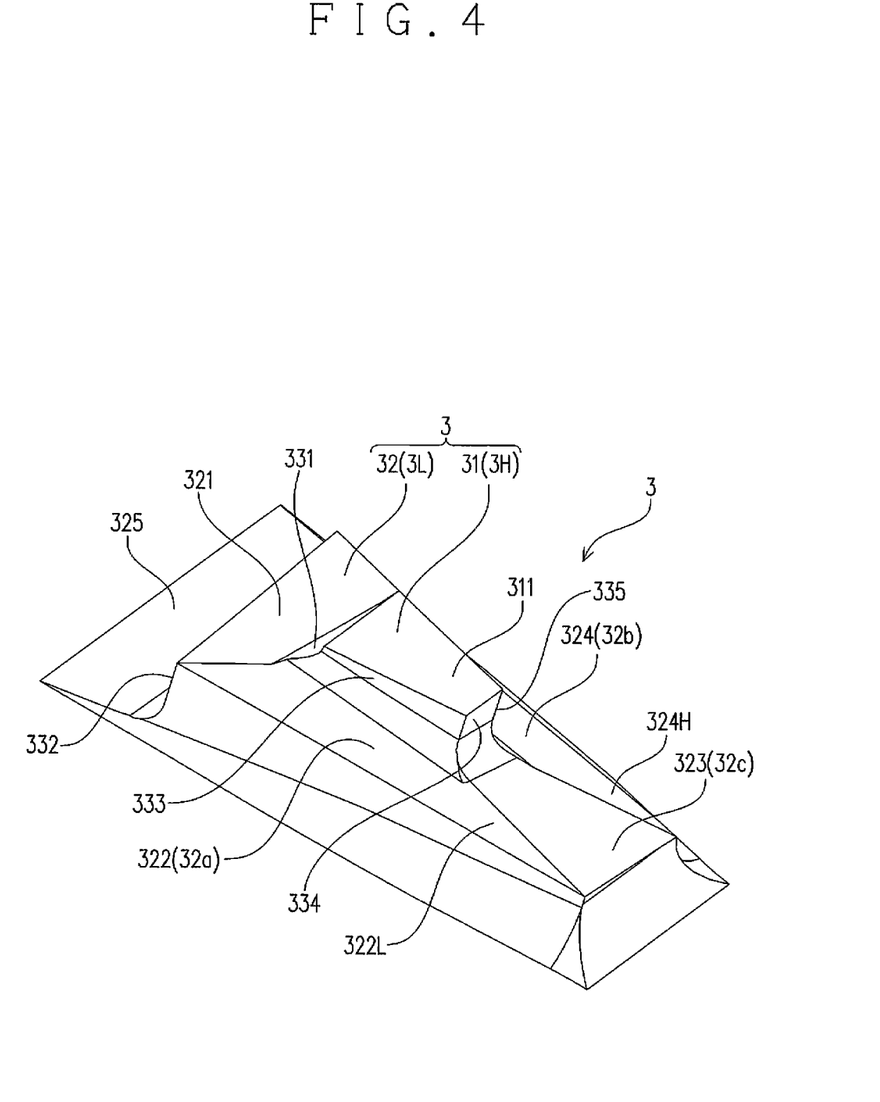
FIG. 4 is a perspective view showing the stone-sticking prevention projection when it is extracted with a third inclined surface on the front side.
Figure 5:
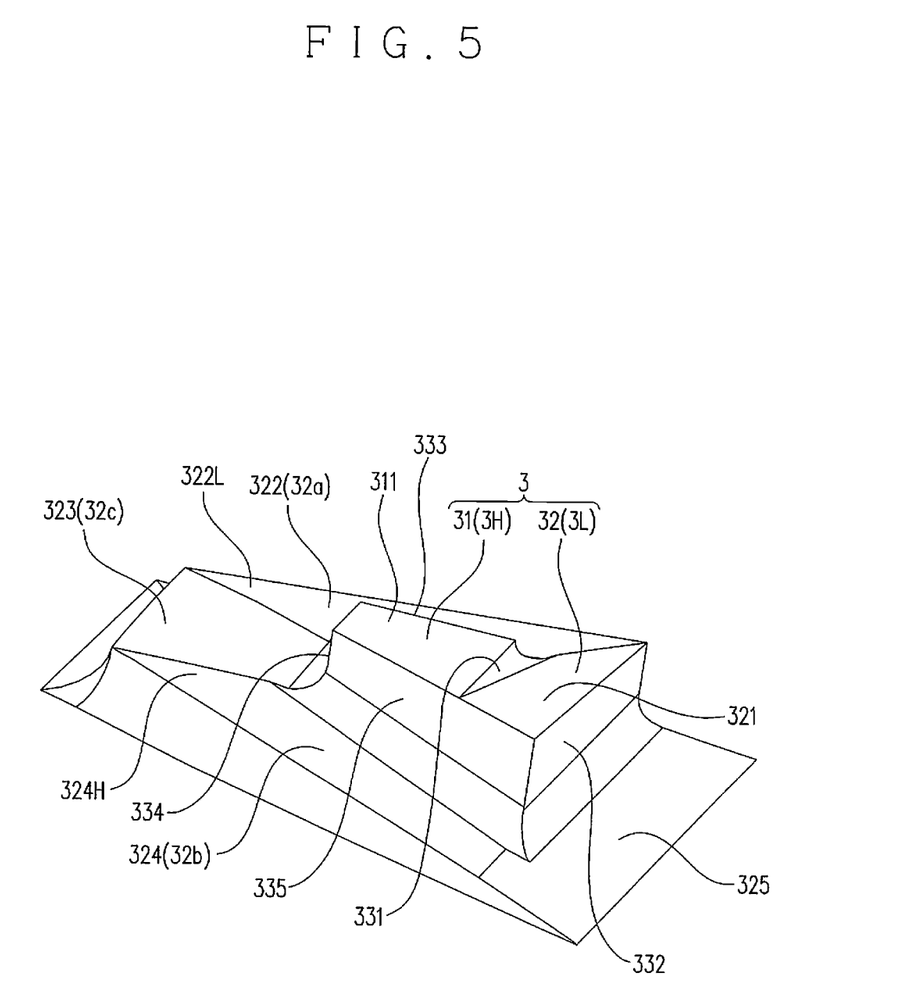
FIG. 5 is a perspective view showing the stone-sticking prevention projection when it is extracted with a first inclined surface on the front side.
Figure 6:
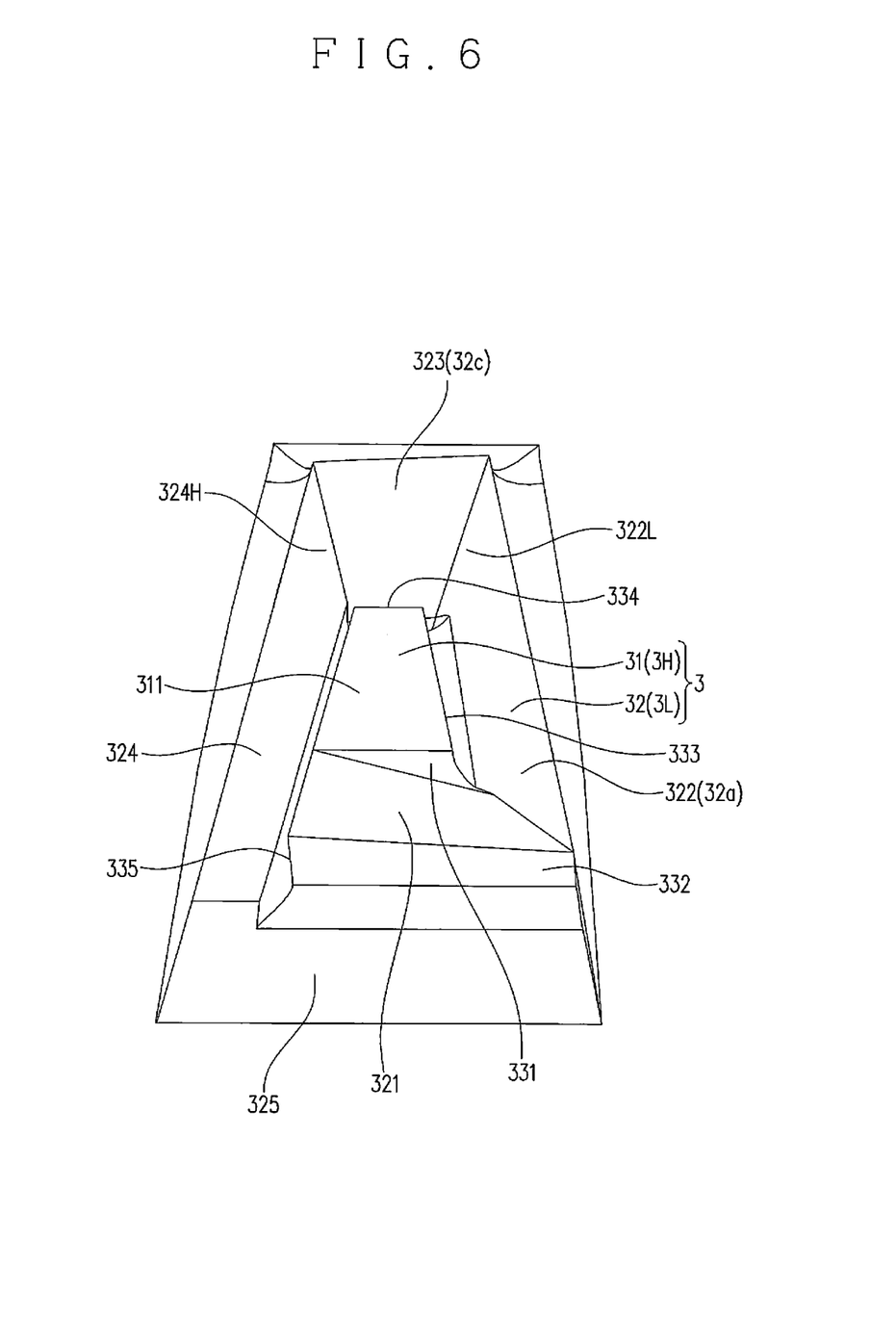
FIG. 6 is a perspective view along the tire width direction showing the stone-sticking prevention projection when it is extracted with the first inclined surface on the front side.
Figure 7:
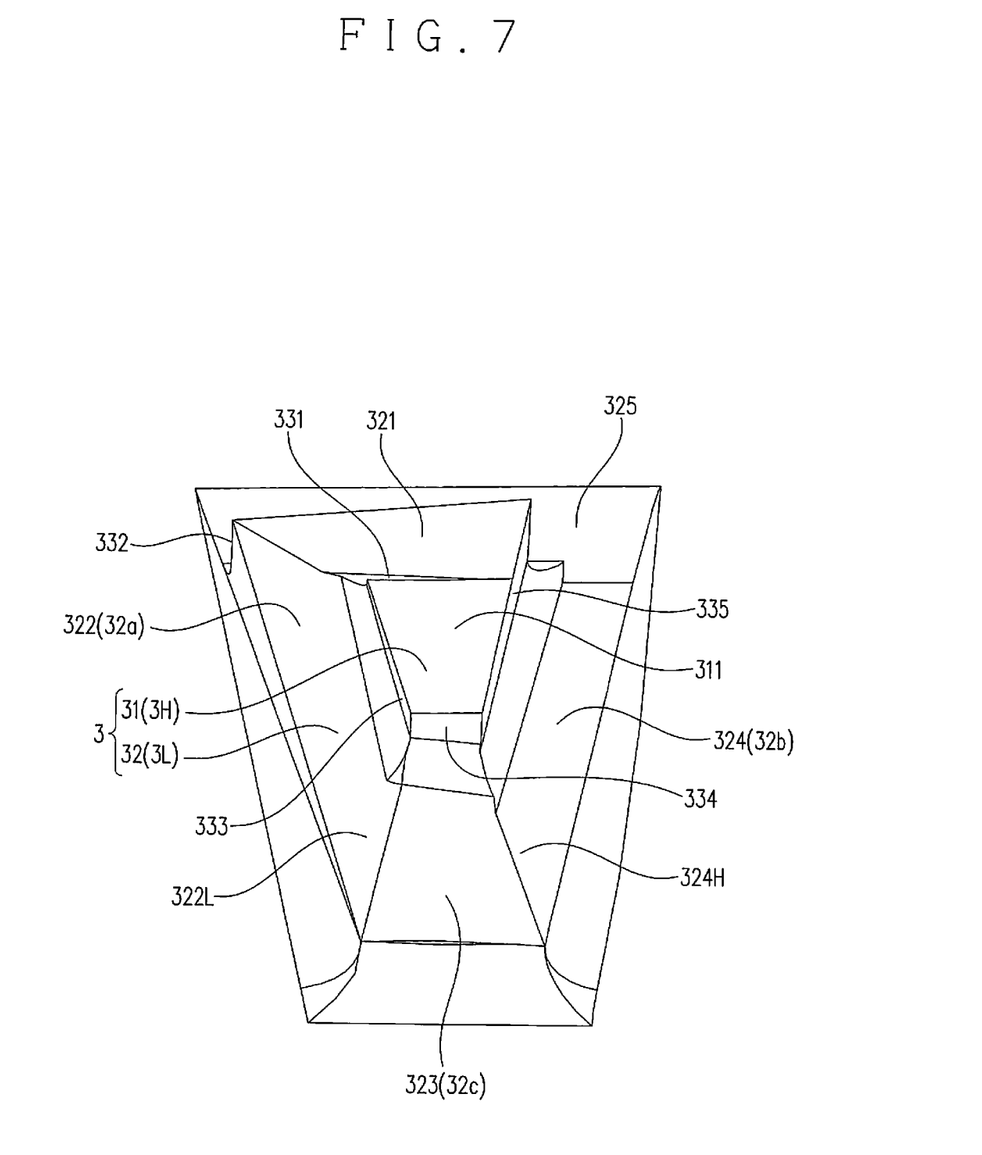
FIG. 7 is a perspective view along the tire width direction showing the stone-sticking prevention projection when it is extracted with the third inclined surface on the front side.

As shown in FIG. 2, the stone-sticking prevention projection 3 projects upward substantially from the center of the groove bottom 121 of the transverse groove 12. As shown in FIG. 3A and FIG. 3B, the specific shape in plan view of the stone-sticking prevention projection 3 is a trapezoid shape, and the stone-sticking prevention projection 3 is located so that the parallel sides of this trapezoid shape extend along the tire circumferential direction. As shown in FIG. 4 and FIG. 5, the stone-sticking prevention projection 3 has a shape having a cross sectional area that gradually decreases upward. Hereinafter, a specific description is given.

A column portion 31 serving as a high-step portion 3H is located at the center of the stone-sticking prevention projection 3. The column portion 31 has a flat top surface 311 on the upper end. A peripheral portion 32 serving as a low-step portion 3L is located surrounding the column portion 31. The column portion 31 and the peripheral portion 32 are integrally formed.

The top surface 311 of the column portion 31 preferably has an area ratio of 10% to 20% with respect to the bottom area of a portion coinciding with the groove bottom 121 of the stone-sticking prevention projection 3. By setting the area ratio in this way, the rigidity of the stone-sticking prevention projection 3 can be appropriately reduced in the upper part of the projection. Therefore, in the case where small stones entering the transverse groove 12 abut the upper part of the stone-sticking prevention projection 3, it is easy to move the small stones and eject them out of the groove by deflection of the upper part of the stone-sticking prevention projection 3.

Further, the height of the stone-sticking prevention projection 3 from the groove bottom 121 is preferably 50% or less, more preferably 30% or less, with respect to the depth of the transverse groove 12. By setting the height of the stone-sticking prevention projection 3 in this way, a reduction in rigidity of the stone-sticking prevention projection 3 and excessive deformation of the stone-sticking prevention projection 3 due to a large height of the projection can be suppressed. Following this, damage to the stone-sticking prevention projection 3 such as cracks and chips can be reduced.

As shown in FIG. 4 to FIG. 7, a first inclined surface 321 that is adjacent to the top surface 311 of the column portion 31, a second inclined surface 322, a third inclined surface 323, a fourth inclined surface 324, and a fifth inclined surface 325 are formed counterclockwise in this order in plan view in the peripheral portion 32 of the stone-sticking prevention projection 3. That is, a plurality of inclined surfaces 321 to 325 are formed in spiral form in the peripheral portion 32 so as to surround the column portion 31. Each of the inclined surfaces has a trapezoid shape in plan view.

As shown in FIG. 3A, the first inclined surface 321 has the shorter side of the parallel sides of the trapezoid shape that is in contact with the column portion 31 (strictly, via an inclined surface 331 shown in FIG. 5), and the oblique side thereof on the upper side in the figure that is located on the extension of the oblique side of the top surface 311 of the column portion 31 on the upper side in the figure. The first inclined surface 321 is inclined so that the oblique side on the upper side in the figure is located at a high position, and the oblique side on the lower side in the figure is located at a low position. The first inclined surface 321 and the fifth inclined surface 325 are adjacent to each other, they are adjacent to each other via a wall surface 332 (see FIG. 5).

As shown in FIG. 3A, the second inclined surface 322 has the shorter side of the parallel sides of the trapezoid shape that is in contact with the column portion 31 via a wall surface 333 (see FIG. 4), and the oblique side thereof on the left in the figure that is adjacent to the first inclined surface 321. The second inclined surface 322 is inclined so that the oblique side on the left in the figure is located at a high position, and the oblique side on the right in the figure is located at a low position.

As shown in FIG. 3A, the third inclined surface 323 has the shorter side of the parallel sides of the trapezoid shape that is in contact with the column portion 31 via a wall surface 334 (see FIG. 4), and the oblique side thereof on the lower side in the figure that is adjacent to the second inclined surface 322. The third inclined surface 323 is inclined so that the oblique side on the lower side in the figure is located at a high position, and the oblique side on the upper side in the figure is located at a low position.

As shown in FIG. 3A, the fourth inclined surface 324 has the shorter side of the parallel sides of the trapezoid shape that is in contact with the column portion 31 via a wall surface 335 (see FIG. 5), and the oblique side thereof on the right in the figure that is adjacent to the third inclined surface 323. The fourth inclined surface 324 is inclined so that the oblique side on the right in the figure is located at a high position, and the oblique side on the left in the figure is located at a low position.

As shown in FIG. 3A, the fifth inclined surface 325 has the shorter side of the parallel sides of the trapezoid shape that is partially adjacent to the fourth inclined surface 324. The fifth inclined surface 325 is inclined so that the shorter side of the parallel sides is located at a high position, and the longer side thereof is located at a low position. The longer side is connected to the groove bottom 121 of the transverse groove 12.

The first inclined surface 321 and the second inclined surface 322 are connected to each other at the same height and are bent toward each other. Respective pairs of the second inclined surface 322 and the third inclined surface 323, the third inclined surface 323 and the fourth inclined surface 324, and the fourth inclined surface 324 and the fifth inclined surface 325 also are connected to each other at the same height and are bent toward each other, in the same manner. Further, the inclined surfaces of the first inclined surface 321 to the fifth inclined surface 325 are connected to one another in a direction in which the inclined surfaces sequentially descend.

The peripheral portion 32 (low-step portion 3L) includes a first-side inclined surface 32a that serves also as a side of a block 2a on a first side (lower side in FIG. 3A) of the plurality of blocks 2 facing the transverse groove 12 and that is inclined in the depth direction of the groove along the first groove side surface 122a of the transverse groove 12. Further, the peripheral portion 32 (low-step portion 3L) includes a second-side inclined surface 32b that serves also as a side of a block 2b on a second side (upper side in FIG. 3A) and that is inclined in the depth direction of the groove along the second groove side surface 122b.

It should be noted that the phrase "along the groove side surface 122a or 122b" means that the direction in which the inclined surface 32a or 32b is inclined from a high position to a low position substantially coincides with the direction in which the groove side surface extends (in this embodiment, the direction in which the groove side surface 122a or 122b extends). In this embodiment, the directions in which the inclined surfaces 32a and 32b are inclined are linear directions respectively parallel to the parallel sides of the trapezoid shape of the inclined surfaces 32a and 32b, and the linear directions substantially coincide respectively with the directions in which the groove side surfaces 122a and 122b extend. In the case where at least either the directions in which the inclined surfaces 32a and 32b are inclined or the directions in which the groove side surfaces 122a and 122b extend are not linear and are curved (for example, in the case where the inclined surfaces are curved as shown in FIG. 8B), the tangential directions at positions where the inclined surfaces 32a and 32b are closest respectively to the groove side surfaces are referred to as "extending directions".

As shown in FIG. 3A, the first-side inclined surface 32a is located on the first groove side surface 122a side of the high-step portion 3H (column portion 31), and the second-side inclined surface 32b is located on the second groove side surface 122b side of the high-step portion 3H (column portion 31). Further, the first-side inclined surface 32a and the second-side inclined surface 32b are inclined in different directions from each other. In this embodiment, the second inclined surface 322 of the first inclined surface 321 to the fifth inclined surface 325 that corresponds to the first-side inclined surface 32a extends along the first groove side surface 122a of the transverse groove 12 (which also serves as the side of the block 2a located on the lower side in the figure). Further, the fourth inclined surface 324 that corresponds to the second-side inclined surface 32b extends along the groove side surface 122b of the transverse groove 12

(which also serves as the side of the block 2*b* located on the upper side in the figure). Further, the second inclined surface 322 is an inclined surface descending from the left toward the right in the figure. On the other hand, the fourth inclined surface 324 is an inclined surface descending from the right toward the left in the figure. In this way, the second inclined surface 322 and the fourth inclined surface 324 are inclined in different directions from each other (more specifically, in the reverse directions).

Further, an inclined connecting surface 32*c* is located between a low end that is located at the lowest position on the first-side inclined surface 32*a* with reference to the groove bottom and a high end that is located at the highest position on the second-side inclined surface 32*b* with reference to the groove bottom, with the low end side of the first-side inclined surface 32*a* located at a high position and the high end side of the second-side inclined surface 32*b* located at a low position. In this embodiment, the third inclined surface 323 that corresponds to the inclined connecting surface 32*c* is located between a low end located at the lowest position on the second inclined surface 322 that corresponds to the first-side inclined surface 32*a* (low end 322L of the second inclined surface 322) with reference to the groove bottom and a high end located at the highest position on the fourth inclined surface 324 that corresponds to the second-side inclined surface 32*b* (high end 324H of the fourth inclined surface 324) with reference to the groove bottom, with the low end side of the second inclined surface 322 located at a high position and the high end side of the fourth inclined surface 324 located at a low position.

As has been described above, since the stone-sticking prevention projection 3 is formed in the transverse groove 12, the space of the transverse groove 12 is partially reduced on the groove bottom side, as shown in FIG. 2. Therefore, small stones entering the transverse groove 12 are mostly bounced against the stone-sticking prevention projection 3. Therefore, small stones entering the transverse groove 12 can be reduced.

The tread of the tire during running repeatedly undergoes bending deformation called "in-plane contraction" by being pressed by the road when the tire is grounded. Such "in-plane contraction" can move small stones, even if they have entered the transverse groove 12, within the transverse groove 12 so as to eject the small stones from the transverse groove 12.

Specifically, as shown in FIG. 3B, small stones S1 and S2 stuck by the blocks 2 and the stone-sticking prevention projection 3 are respectively moved along the inclined surfaces 322 (32*a*) and 324 (32*b*) in the directions M1 and M2 shown by arrows in the figure, and are guided from a high position to a low position of the inclined surfaces 322 (32*a*) and 324 (32*b*). As a result of this, the small stones can be guided to portions of the transverse groove 12 with comparatively large space. In this embodiment, the right part 121*a* of the third inclined surface 323 in the figure and the left part 121*b* of the fifth inclined surface 325 in the figure correspond to the portions with comparatively large space. Since the small stones S1 and S2 guided to the portions with comparatively large space become no longer stuck, or since the sticking degree by the blocks 2 and the stone-sticking prevention projection 3 is reduced as compared to before the movement, they escape from the transverse groove 12 by receiving the centrifugal force due to rotation of the tire. That is, the small stones are ejected from the transverse groove 12.

In this way, in the tire of this embodiment, small stones are less likely to be stuck, and small stones, even in the case of being stuck, can be rapidly ejected from the groove.

Hereinbefore, the present invention embodiment has been described. However, the present invention is not limited to this embodiment, and various modifications can be made without departing from the gist of the present invention.

Figure 8A:
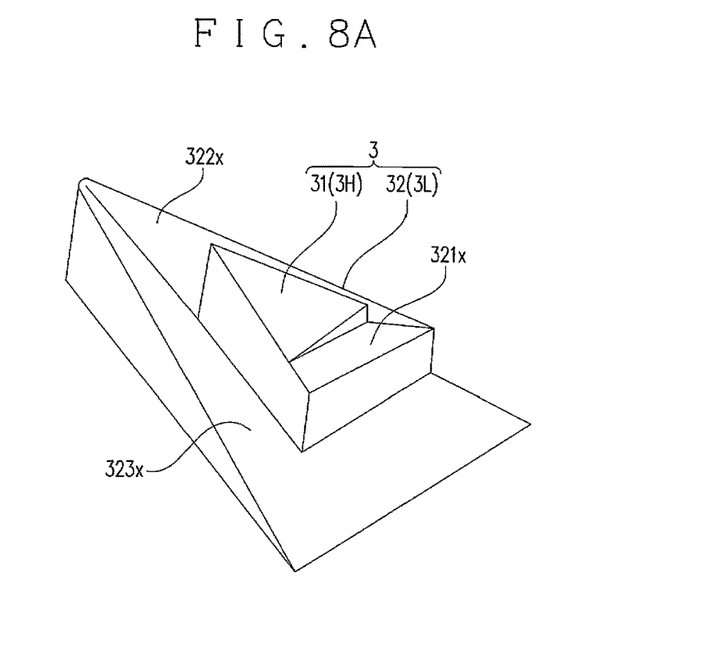
FIG. 8A is a perspective view showing a stone-sticking prevention projection having a triangular shape according to another embodiment in plan view.
Figure 8B:
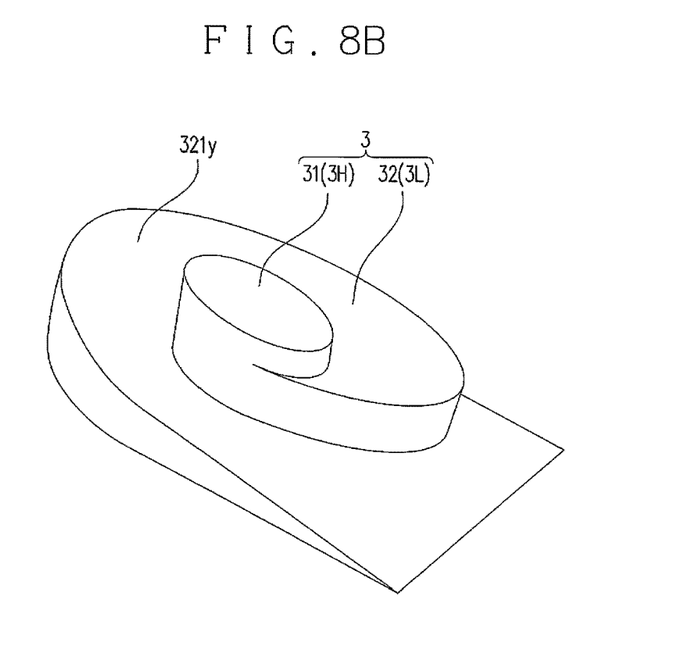
FIG. 8B is a perspective view showing a stone-sticking prevention projection having an elliptical shape according to another embodiment in plan view.

For example, the shape in plan view of the stone-sticking prevention projection 3 is not limited to the trapezoid shape described in the aforementioned embodiment, and may be a triangular shape shown in FIG. 8A or an elliptical shape shown in FIG. 8B. In the stone-sticking prevention projection 3 shown in FIG. 8A, a first inclined surface 321*x*, a second inclined surface 322*x*, and a third inclined surface 323*x* are formed, in the same manner as in the aforementioned embodiment. In the stone-sticking prevention projection 3 shown in FIG. 8B, a continuous inclined surface 321*y* is formed. The stone-sticking prevention projection 3 having the shapes shown in FIG. 8A and FIG. 8B also can guide small stones stuck by the blocks 2 and the stone-sticking prevention projection 3 from a high position to a low position along the inclined surfaces (321*x*, 322*x*, and 323*x*/321*y*), and therefore can guide the small stones to the portions with comparatively large space in a groove in which the stone-sticking prevention projection 3 is formed, such as the transverse groove 12. Accordingly, also in a tire in which the stone-sticking prevention projection 3 having a shape shown in FIG. 8A or FIG. 8B is formed, small stones are less likely to be stuck, and small stones, even in the case of being stuck, can be rapidly ejected from the groove. The stone-sticking prevention projection 3 may have various shapes in plan view such as a square shape, a rectangular shape, a polygonal shape (pentagon or more), a true circular shape, an oblong shape, a semicircular shape, a cross shape, and a V-shape, though not shown in the figure, in addition to the shapes shown in FIG. 8A and FIG. 8B.

Further, the tread pattern of the tire in which the stone-sticking prevention projection 3 is formed is not limited to the block pattern of the aforementioned embodiment, and the tire may have a rib pattern.

Further, the groove in which the stone-sticking prevention projection 3 is formed is not limited to the transverse groove 12, and the stone-sticking prevention projection 3 may be formed in various grooves formed in the tread such as the main grooves 11 so as to project from their groove bottoms. Also in this case, the relationship between the first-side inclined surface 32*a* and the second-side inclined surface 32*b* may be the same as in the aforementioned embodiment. Further, a plurality of stone-sticking prevention projections 3 may be formed in a groove.

Further, the first groove side surface 122*a* and the second groove side surface 122*b* of the transverse groove 12 are opposed to each other in the aforementioned embodiment, but the positional relationship of the groove side surfaces is not limited thereto. For example, the first groove side surface 122*a* and the second groove side surface 122*b* may have a positional relationship in which they overlap each other, so that they intersect each other in the form of a V-shape, or they are orthogonal to each other in the form of an L-shape.

Further, the top surface 311 of the column portion 31 is not limited to a flat surface, and may be an inclined surface or a curved surface. Further, the inclined surface of the peripheral portion 32 is not limited to a flat surface, and may be a curved surface. Further, adjacent inclined surfaces are bent toward each other in the aforementioned embodiment, but may be formed not to be bent toward each other by being constantly inclined or continuously variously inclined. For example, in the stone-sticking prevention projection 3 shown in FIG. 8B, a series of sequentially descending inclinations are formed in the peripheral portion 32. Further, a flat surface parallel to the groove bottom 121 can connect an inclined surface and another inclined surface. Further, adjacent inclined surfaces are not necessarily connected so that an end of one of the inclined surfaces and an end of the other of the inclined surfaces have the same height, for example, in the case where a step or a space is present between the adjacent inclined surfaces.

Further, the low-step portion 3L and the high-step portion 3H are not limited to the aforementioned embodiment in which the inclined surfaces are continuous from upward to downward, as described above, and may be disconnected via walls. Further, the stone-sticking prevention projection 3 of the aforementioned embodiment is constituted by two steps of the low-step portion 3L and the high-step portion 3H, but may be constituted by three or more steps. In this case, the high-step portion 3H may be constituted by a plurality of steps exerting an action to abut small stones that have entered a groove of a tire during running so as to prevent them from entering the inside of the groove, in some cases. Likewise, the low-step portion 3L may be constituted by a plurality of steps capable of exerting an action to move small stones that have entered the space formed by the groove side surfaces of the groove and the high-step portion 3H, in some cases.

Figure 9:
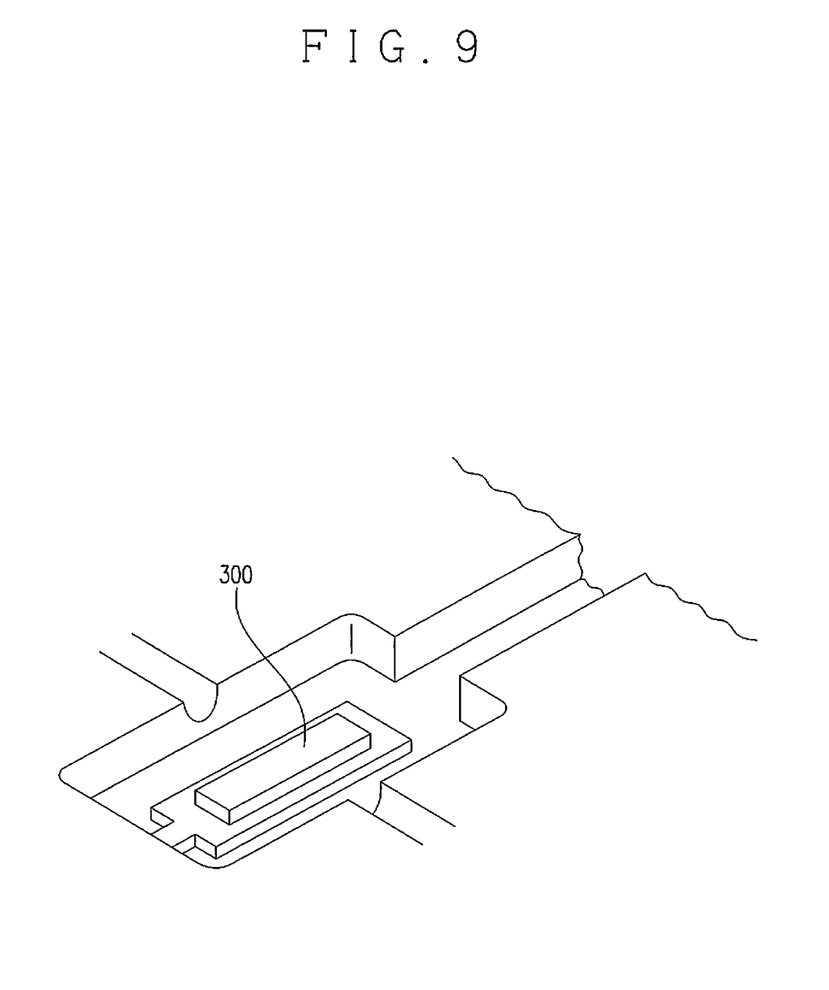
FIG. 9 is a perspective view showing an example of a projection formed at a groove bottom as a comparative example for evaluation.

Next, the inventor of the subject application experimentally manufactured tires as examples and evaluated them. In the examples, a tire in which the stone-sticking prevention projection 3 shown in FIG. 1 to FIG. 7 is formed serves as Example 1, a tire in which the stone-sticking prevention projection 3 shown in FIG. 8A is formed serves as Example 2, and a tire in which the stone-sticking prevention projection 3 shown in FIG. 8B is formed serves as Example 3. The aforementioned evaluation is described. A tire in which a projection 300 having two-step configuration without inclination is formed, as shown in FIG. 9, serves as a comparative example.

First, ejectability was evaluated as an index by running 1000 m at low speed (20 km per hour) on an unpaved road (gravel road), counting the number of small stones stuck in the tire, and converting the inverse of a numerical value, with the denominator being the counted number in the comparative example and the numerator being the counted number in each example, into 100. A larger index means that the small stones are more easily ejected.

Next, groove-crack resistance was evaluated as an index by running 50000 km with a test tire (LT265/70R17), thereafter observing the occurrence of groove cracks (microcracks) at the groove bottoms of the main grooves 11 by visual inspection, counting the number of sites where the cracks occurred, and converting the inverse of a numerical value, with the denominator being the counted number in the comparative example and the numerator being the counted number in each example, into 100. A larger index means that the groove crack resistance is more excellent.

Both ejectability and groove crack resistance of Examples 1 to 3 were evaluated to be 105. That is, it was confirmed that Examples 1 to 3 were more excellent than the comparative example. Accordingly, the tire of the present invention was proved to be advantageous.

Finally, the configuration of the embodiment of the present invention and actions exerted by the configuration are summarized.

This embodiment is a pneumatic tire including: a transverse groove 12 formed in a tread, the transverse groove 12 having a groove bottom 121 and groove side surfaces 122a and 122b arising from the groove bottom 121; and a stone-sticking prevention projection 3 projecting from the groove bottom 121, wherein the stone-sticking prevention projection 3 includes a low-step portion 3L (peripheral portion 32) located at a low position with reference to the groove bottom and a high-step portion 3H (column portion 31) located at a high position with reference to the groove bottom, the low-step portion 3L (peripheral portion 32) includes a first-side inclined surface 32a inclined in a depth direction of the transverse groove 12 along the first groove side surface 122a of the transverse groove 12 and a second-side inclined surface 32b inclined in the depth direction of the transverse groove 12 along the second groove side surface 122b of the transverse groove 12, and the first-side inclined surface 32a and the second-side inclined surface 32b are inclined in different directions.

According to this configuration, the stone-sticking prevention projection 3 includes the low-step portion 3L (peripheral portion 32) and the high-step portion 3H (column portion 32), the low-step portion 3L (peripheral portion 32) includes the first-side inclined surface 32a inclined in the depth direction of the transverse groove 12 along the first groove side surface 122a of the transverse groove 12 and the second-side inclined surface 32b inclined in the depth direction of the transverse groove 12 along the second groove side surface 122b of the transverse groove 12, and the first-side inclined surface 32a and the second-side inclined surface 32b are inclined in different directions. Therefore, in the high-step portion 3H (column portion 32), small stones that have entered the transverse groove 12 in which the stone-sticking prevention projection 3 is formed during running of the tire abut the high-step portion 3H (column portion 32), thereby being prevented from entering the inside of the groove. Further, in the low-step portion 3L (peripheral portion 32), the small stones S1 and S2 that have entered the space formed by the groove side surfaces 122a and 122b of the transverse groove 12 and the high-step portion 3H (column portion 32) can be guided, for example, to relatively large regions 121a and 121b in the transverse groove 12 by the first-side inclined surface 32a and the second-side inclined surface 32b. Further, the first-side inclined surface 32a and the second-side inclined surface 32b are inclined in different directions, and therefore the small stones S1 and S2 located on the inclined surfaces 32a and 32b can be respectively moved in different directions M1 and M2 along the inclined surfaces.

Further, the configuration may be such that the first groove side surface 122a and the second groove side surface 122b of the transverse groove 12 are opposed to each other, the first-side inclined surface 32a is located on the first groove side surface side of the high-step portion 3H (column portion 32), the second-side inclined surface 32b is located on the second groove side surface side of the high-step portion 3H (column portion 32), the first-side inclined surface 32a and the second-side inclined surface 32b are inclined in reverse directions, and the inclined connecting surface 32c is located between the low end 322L located at the lowest position on the first-side inclined surface 32a with reference to the groove bottom and the high end 324H located at the highest position on the second-side inclined surface 32b with reference to the groove bottom, with the low end side of the first-side inclined surface 32a located at a high position and the high end side of the second-side inclined surface 32b located at a low position.

According to this configuration, the first-side inclined surface 32a, the inclined connecting surface 32c, and the second-side inclined surface 32b are continuously located, and therefore the inclined surfaces 32a, 32c, and 32b can be continuous from the high side to the low side. Therefore, the small stones S1 and S2 can be moved smoothly along the inclined surfaces 32a, 32c, and 32b.

Further, the configuration may be such that the stone-sticking prevention projection 3 has the top surface 311 at the highest position with reference to the groove bottom, and the top surface 311 has an area ratio of 10 to 20% with respect to the bottom area of the stone-sticking prevention projection 3. According to such a configuration, the rigidity of the stone-sticking prevention projection 3 can be appropriately reduced in the upper part of the stone-sticking prevention projection 3. Therefore, when small stones entering the transverse groove 12 abut the upper part of the stone-sticking prevention projection 3, the small stones can be easily ejected by deflection of the upper part of the stone-sticking prevention projection 3.

Further, the configuration may be such that the stone-sticking prevention projection 3 has a height from the groove bottom of not more than 50% with respect to the depth of the transverse groove 12. According to such a configuration, a reduction in rigidity of the stone-sticking prevention projection 3 due to a large height of the projection and excessive deformation of the stone-sticking prevention projection 3 can be suppressed, and damage to the stone-sticking prevention projection 3 such as cracks and chips can be reduced.

As has been described above, according to this embodiment, the high-step portion 3H (column portion 32) prevents the small stones S1 and S2 from entering the inside of the groove. Further, in the low-step portion 3L (peripheral portion 32), the small stones S1 and S2 that have entered the space formed by the groove side surfaces 122a and 122b of the transverse groove 12 and the high-step portion 3H (column portion 32) can be moved within the transverse groove 12 in the different directions M1 and M2 by the first-side inclined surface 32a and the second-side inclined surface 32b inclined in different directions so as to be guided to the relatively large regions 121a and 121b of the transverse groove 12. Therefore, the small stones S1 and S2 are less likely to be stuck in the transverse groove 12, and even in the case where the small stones S1 and S2 are stuck in the transverse groove 12, they can be rapidly ejected from the groove.

The pneumatic tire of this embodiment is as described above. However, the present invention is not limited to the aforementioned embodiment, and the design can be appropriately modified within the scope intended by the present invention. The operational advantage of the present invention is also not limited to the foregoing embodiments. The embodiments disclosed herein should be construed in all respects as illustrative but not limiting. The scope of the present invention is not indicated by the foregoing description but by the scope of the claims. Further, the scope of the present invention is intended to include all the modifications equivalent in the sense and the scope to the scope of the claims.

What is claimed is:

1. A pneumatic tire comprising:
a groove formed in a tread, the groove having a groove bottom and groove side surfaces arising from the groove bottom; and
a projection projecting from the groove bottom, wherein
the projection includes a low-step portion located at a low position with reference to the groove bottom and a high-step portion located at a high position with reference to the groove bottom,
the low-step portion includes a plurality of inclined surfaces formed in spiral form so as to surround the high-step portion,
the plurality of inclined surfaces are connected in a direction in which the inclined surfaces sequentially descend,
the low-step portion includes a first-side inclined surface inclined in a depth direction of the groove along a first groove side surface of the groove and a second-side inclined surface inclined in the depth direction of the groove along a second groove side surface of the groove, and
the first-side inclined surface and the second-side inclined surface are inclined in different directions from each other.

2. The pneumatic tire according to claim 1, wherein
the first groove side surface and the second groove side surface of the groove are opposed to each other,
the first-side inclined surface is located on the first groove side surface side of the high-step portion,
the second-side inclined surface is located on the second groove side surface side of the high-step portion,
the first-side inclined surface and the second-side inclined surface are inclined in reverse directions to each other, and
an inclined connecting surface is located between a low end located at the lowest position on the first-side inclined surface with reference to the groove bottom and a high end located at the highest position on the second-side inclined surface with reference to the groove bottom, with the low end side of the first-side inclined surface located at a high position and the high end side of the second-side inclined surface located at a low position.

3. The pneumatic tire according to claim 1, wherein
the projection has a top surface at the highest position with reference to the groove bottom, and
the top surface has an area ratio of 10 to 20% with respect to a bottom area of the projection.

4. The pneumatic tire according to claim 1, wherein
the projection has a height from the groove bottom of not more than 50% with respect to a depth of the groove.

* * * * *